(12) United States Patent
Ball

(10) Patent No.: US 11,946,577 B2
(45) Date of Patent: Apr. 2, 2024

(54) ADJUSTABLE-LENGTH WATER SUPPLY ADAPTER

(71) Applicant: Kohler Co., Kohler, WI (US)

(72) Inventor: Matthew J. Ball, Sheboygan, WI (US)

(73) Assignee: KOHLER CO., Kohler, WI (US)

( * ) Notice: Subject to any disclaimer, the term of this patent is extended or adjusted under 35 U.S.C. 154(b) by 0 days.

(21) Appl. No.: 17/686,887

(22) Filed: Mar. 4, 2022

(65) Prior Publication Data

US 2022/0186865 A1 Jun. 16, 2022

Related U.S. Application Data

(62) Division of application No. 16/452,790, filed on Jun. 26, 2019, now Pat. No. 11,268,640.

(60) Provisional application No. 62/691,189, filed on Jun. 28, 2018.

(51) Int. Cl.
*F16L 27/12* (2006.01)
*F16L 15/02* (2006.01)

(52) U.S. Cl.
CPC .............. *F16L 27/12* (2013.01); *F16L 15/02* (2013.01); *Y10T 29/49826* (2015.01)

(58) Field of Classification Search
CPC ......... F16L 27/12; F16L 27/125; F16L 15/02; F16L 37/505
USPC ................................................ 285/4, 39, 298
See application file for complete search history.

(56) References Cited

U.S. PATENT DOCUMENTS

| | | | |
|---|---|---|---|
| 492,946 A | 3/1893 | Ricketts | |
| 2,111,357 A | 3/1938 | Cornell | |
| 3,480,299 A | 11/1969 | Henderson | |
| 4,453,749 A | 6/1984 | McKinnon | |
| 5,482,329 A * | 1/1996 | McCall | F16L 41/14 285/39 |
| 6,959,880 B2 | 11/2005 | Swingley | |
| 2007/0241563 A1 | 10/2007 | Marks et al. | |

FOREIGN PATENT DOCUMENTS

CN 203583593 5/2014

OTHER PUBLICATIONS

Chinese Office Action CN Application No. 201910572900.6 dated Nov. 23, 2020 11 pages.
(Continued)

*Primary Examiner* — Zachary T Dragicevich
(74) *Attorney, Agent, or Firm* — FOLEY & LARDNER LLP

(57) ABSTRACT

A method of installing a plumbing fixture to an outlet of a water supply assembly located behind a wall includes providing a plumbing fixture including an attachment structure. The method also includes providing an adapter configured to couple the plumbing fixture to an outlet of a water supply assembly. The adapter includes an annular body, a plurality of collars, and an engagement structure. The annular body extends between a first end and a second end and defining a bore extending therethrough. The plurality of collars is provided along an exterior of the annular body and spaced inwardly from the first end such that each of the collars is separated from an adjacent one of the collars in a lateral direction by a recess. The engagement structure is provided along the exterior at the second end.

19 Claims, 4 Drawing Sheets

(56) References Cited

OTHER PUBLICATIONS

First Office Action on Chinese Appln. Ser. No. 201910572900.6 dated Jun. 3, 2020 (13 pages).

* cited by examiner

ADJUSTABLE-LENGTH WATER SUPPLY ADAPTER

CROSS-REFERENCE TO RELATED PATENT APPLICATIONS

This application is a Divisional of U.S. patent application Ser. No. 16/452,790, filed Jun. 26, 2019, now U.S. Pat. No. 11,268,640, which claims the benefit of and priority to U.S. Provisional Application No. 62/691,189, filed Jun. 28, 2018. The entire disclosures of the foregoing applications are hereby incorporated by reference herein.

BACKGROUND

This application relates generally to the field of adapters for fluidly connecting a plumbing fixture to a water supply. More specifically, this application relates to adapters having an adjustable length to accommodate the installation of the adapter to water supplies having outlets located at various depths behind a finished wall surface.

Generally, wall-mounted plumbing fixtures (e.g., shower heads, tub fillers, etc.) are coupled to a water supply via a small opening in a wall to which a plumbing fixture is attached. During installation of the plumbing fixture, a first threaded end of a pipe nipple (e.g., male-male) is attached to a standardized national pipe thread ("NPT") formed about an interior of an elbow outlet of the water supply. A second threaded end of the pipe nipple is attached to the plumbing assembly, and fluidly couples the plumbing fixture to a water supply line of the water supply.

The installation of a plumbing fixture using a pipe nipple suffers a number of drawbacks. For example, as noted above, water supply outlets are often installed at different (e.g., non-standardized) depths relative to the outer surface of a wall. Additionally, it may difficult for an installer to ascertain the depth at which an outlet is located prior to the installation of a plumbing fixture, as such a determination typically requires uninstalling (and decommissioning) an existing plumbing fixture that is coupled to the outlet. Thus, unless a variety of pipe nipples of differing lengths are readily available during the installation of a new plumbing fixture, the installation of the plumbing fixture may be delayed until an appropriately sized pipe nipple is located, increasing downtime of the bathroom or other space (e.g., a sanitary space).

Installation of a pipe nipple is often also complicated by the short length of a pipe nipple. In particular, upon installation, the pipe nipple may be located entirely behind a wall. Given the limited access to a rear portion of a wall provided by the opening in the wall, the ability of an installer to use tools (e.g. a wrench, pliers, etc.) to install the pipe nipple without damaging the wall may be limited.

The dual-threaded configuration of a conventional pipe nipple also may present problems during the installation of a plumbing fixture. Notably, installing a plumbing fixture with a non-circular cross-sectional profile in a correct orientation—while also ensuring that the plumbing fixture is disposed directly against the outer surface of the wall—often requires that the threads on one or both ends of the pipe nipple not be fully threaded into corresponding threading on one or both of the elbow and the attachment structure of the plumbing fixture. This partial engagement of the threading of the pipe nipple to one or both of the plumbing fixture and water supply reduces the quality of the seal between these components. The adverse effect on the seal between the adapter and one or both of the plumbing fixture and water supply may be compounded if the pipe nipple includes a tapered threaded section, as the smaller diameter at the first end of the thread on the pipe nipple may not be large enough to properly engage the inner threads of the elbow outlet and/or the inner threads of the plumbing fixture conduit.

It would therefore be advantageous to provide an adapter with an adjustable length for connecting a plumbing fixture to a water supply line. In particular, it would be advantageous to provide a single adapter that can be cut to different desired lengths.

SUMMARY

According to one implementation of the present disclosure, an adapter for coupling a plumbing fixture to a water supply assembly includes an annular body, a plurality of collars, and an engagement structure. The annular body is configured to fluidly couple a plumbing fixture to an outlet of a water supply assembly. The annular body extends between a first end and a second end and defines a bore extending therethrough. The plurality of collars are provided along an exterior of the annular body. The plurality of collars are spaced inwardly from the first end of the annular body such that each collar is separated from an adjacent collar by a portion of the exterior of the annular body along which no collars are provided. The engagement structure is provided along the exterior of the annular body second end. The engagement structure is configured to releasably engage a corresponding structure provided by a plumbing fixture. The engagement structure includes a channel defined by an exterior of the annular body within which a sealing gasket is supported. The plurality of collars are each individually configured to releasably engage a corresponding structure provided by the water supply assembly such that, upon the removal of one or more collars from the adapter, a collar remaining attached to the annular body allows the adapter to be coupled to the water supply assembly.

According to some embodiments, a thread is formed along an external surface of each collar. The external thread of each collar is configured to engage a corresponding internally extending thread provided by the water supply assembly. According to some embodiments, each collar extends between a first end and a second end. An external surface of each collar is tapered between a respective first end and a respective second end of a collar.

According to some embodiments, the adapter further includes a driving structure formed along an interior of the annular body about the portion of the bore located adjacent the second end of the annular body. The driving structure is configured to engage a tool received within the bore of the annular body to rotate the adapter relative to the water supply assembly.

According to some embodiments, a thickness of the adapter at a location along the annular body at which a collar extends is greater than a thickness of the adapter at a location at which no collars are provided. According to some embodiments, an outer diameter of the adapter at a location along the annular body at which a collar extends is greater than a diameter of the adapter at a location at which no collars are provided.

According to one implementation of the present disclosure, a plumbing fixture assembly includes a plumbing fixture and an adjustable length adapter. The plumbing fixture is configured to selectively dispense water. The plumbing fixture includes an attachment structure. The adjustable length adapter is configured to couple the plumbing fixture to an outlet of a water supply assembly. The adapter includes an annular body, a plurality of collars and an engagement structure. The annular body extends between a first end and a second end and defining a bore extending therethrough. The plurality of collars are provided along an exterior of the annular body and are spaced inwardly from the first end of the annular body such that each collar is laterally offset from an adjacent collar by a recess. The engagement structure is provided along the exterior of the annular body at the second end. The engagement structure is configured to engage the attachment structure to the plumbing fixture to couple the plumbing fixture to the adapter. The plurality of collars are each individually configured to releasably engage a corresponding structure provided on the outlet of the water supply assembly, such that upon the removal of one or more collars from the adapter, at least one collar remains attached to the adapter and allows the adapter to be coupled to the water supply assembly.

According to some embodiments, the attachment structure of the plumbing fixture allows the plumbing fixture to be coupled to the engagement structure of the adapter without requiring a rotation of the plumbing fixture relative to the adapter. According to some embodiments, the engagement structure includes a channel defined by an exterior of the annular body within which a sealing gasket is supported. According to some embodiments a thread is formed along an external surface of each collar. The external thread of each collar is configured to engage a corresponding internally extending thread provided by the water supply assembly outlet.

According to some embodiments, each collar extends between a first end and a second end. An outer diameter of the second end of a collar is greater than an outer diameter of the first end of the collar.

According to some embodiments, the plumbing fixture assembly further includes a driving structure formed along an interior of the annular body about the portion of the bore located adjacent the second end of the annular body. The driving structure is configured to engage a tool received within the bore of the annular body to rotate the adapter relative to the water supply assembly.

According to some embodiments, a thickness of the adapter at a location along the annular body at which a collar extends is greater than a thickness of the adapter at a location corresponding to a recess. According to some embodiments, an outer diameter of the adapter at a location along the annular body at which a collar extends is greater than a diameter of the adapter at a location at which no collars are provided.

According to one implementation of the present disclosure, a method of installing a plumbing fixture to an outlet of a water supply assembly located behind a wall includes providing a plumbing fixture including an attachment structure, a providing an adapter. The adapter is configured to couple the plumbing fixture to the outlet of the water supply assembly. The adapter includes an annular body, a plurality of collars, and an engagement structure. The annular body extends between a first end and a second end and defines a bore extending therethrough. A plurality of collars are along an exterior of the annular body and are spaced inwardly from the first end of the annular body such that each collar is separated from an adjacent collar in a lateral direction by a recess. The engagement structure is provided along the exterior of the annular body at the second end. The engagement structure is configured to engage the attachment structure to the plumbing fixture to couple the plumbing fixture to the adapter. A user removes at least one collar from the adapter to shorten the adapter.

According to some embodiments, the plurality of collars are each individually configured to releasably engage a corresponding structure provided on the outlet. According to some embodiments, the adapter is cut along the first recess to separate the collar from the adapter. The adapter is attached to the outlet via a collar remaining on the annular body that is located farthest from the second end of the annular body. According to some embodiments, the adapter further includes a driving structure formed along an interior of the annular body about the portion of the bore located adjacent the second end of the annular body According to some embodiments, the adapter is attached to the outlet in response to a rotation of a tool that is engaged to the driving structure.

According to some embodiments the engagement structure of the annular body is coupled to the attachment structure of the plumbing fixture. According to some embodiments, the engagement structure of the annular body is coupled to the attachment structure of the plumbing fixture without the plumbing fixture being rotated relative to the annular body. According to some embodiments, an exterior surface of each collar is tapered.

According to some embodiments, the recess is formed between adjacent collars is sized to accommodate and/or guide a saw blade therein. Another embodiment relates to a method of replacing a plumbing fixture including measuring an offset length from an elbow to an outer surface of a wall. The method further includes providing an adapter including a body having a first end and an opposing second end, a plurality of threaded annular collars, and recesses formed between each of the collars. The method further includes cutting the adapter at a recess spaced apart from the second end of the body at an adapter length greater than the offset length.

DETAILED DESCRIPTION

Referring generally to the FIGURES, an adapter configured to minimize the effort, time, and inconvenience typically associated with the installation of a plumbing fixture to a water supply assembly using conventional connector conduit structures (e.g., a pipe nipple) is shown and described according to various embodiments. The adapter includes a plurality of individually separable collars that allow for easy, on-site adjustment of the length of the adapter based on a measured offset of an elbow outlet at the installation location. Thus, the adapter obviates the need for an installer to stock a plurality of connector conduits of varying lengths to avoid delays caused by the unavailability of an appropriately sized connector during the installation of the plumbing fixture. An exterior of each collar is configured to sealingly engage the outlet opening (e.g. elbow outlet) of a water supply assembly, such that the adjustment to the length of the adapter does not compromise the ability of the adapter to be sealingly coupled to the water supply assembly.

The length of the adapter—which is configured to extend beyond the outer surface of the wall upon installation—minimizes (or does not require) the need for a user to maneuver tools through a narrow opening in the wall to couple the adapter to the water supply assembly. In addition to simplifying the installation of the adapter to the water supply assembly outlet, the installed configuration of the adapter relative to the exterior of the wall minimizes the risk of damage to the wall during installation of the plumbing fixture. A slip fitting provided along the adapter allows the plumbing fixture to be installed flush against a wall in a desired orientation, without compromising the sealing engagement between the adapter and either of the plumbing fixture or outlet opening.

Figure 1:
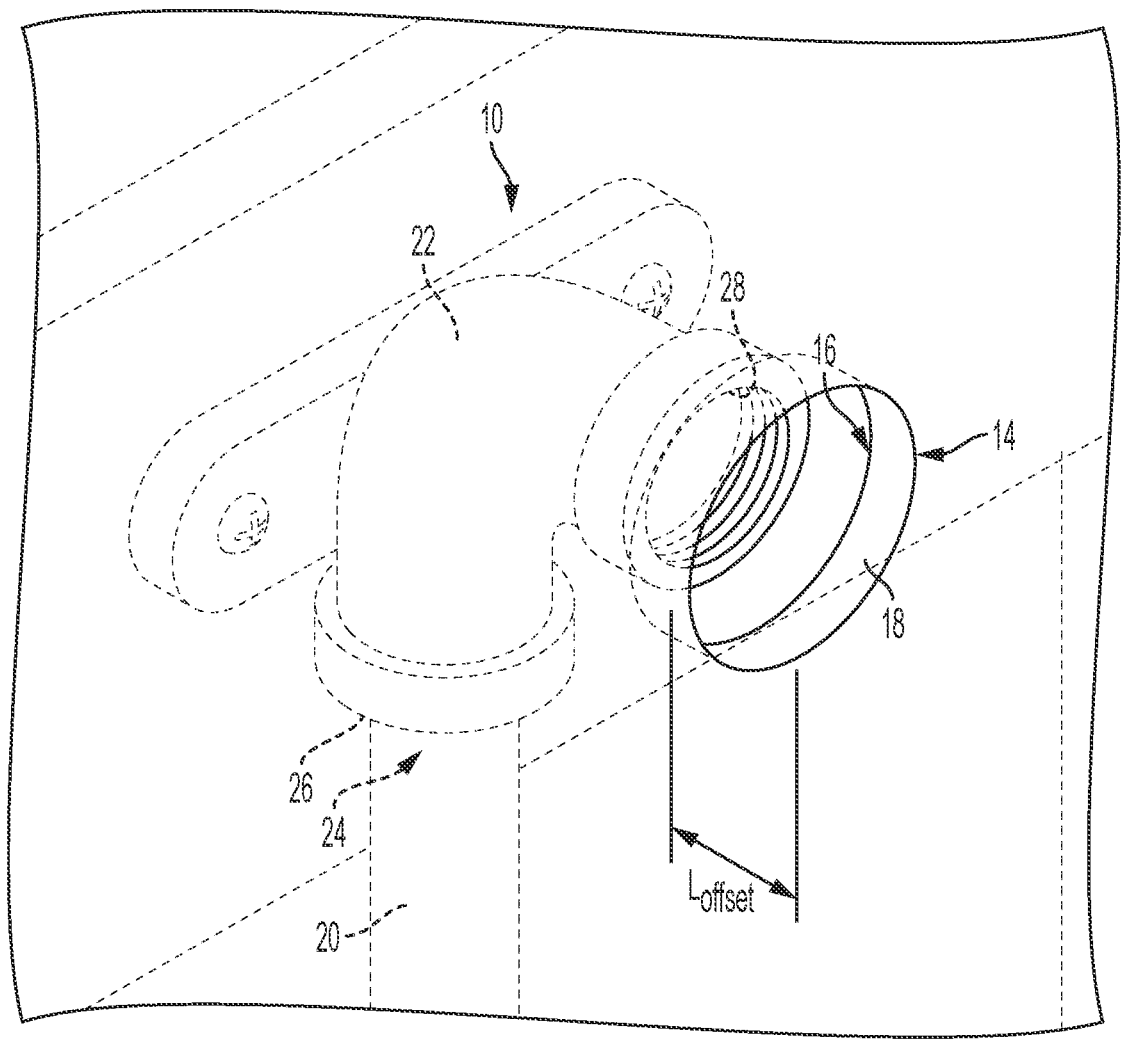
FIG. 1 is a perspective view of a water supply assembly to which a plumbing fixture may be fluidly couple, according to an exemplary embodiment.

Turning to FIG. 1, a water supply assembly 10 via which wall-mounted plumbing fixtures (e.g., shower heads, tub fillers, etc.) are typically plumbed to a water source is shown according to an exemplary embodiment. As shown in FIG. 1, the water supply assembly 10 includes a water supply line 20 and an elbow 22 (or other connector). The water supply line 20 and elbow 22 are each located and concealed (e.g. hidden) behind the wall 12.

The water supply line 20 delivers water from a water source to a location at which the plumbing fixture is installed. An elbow inlet 26 (e.g., first end, upstream end, etc.) is attached to a downstream end 24 of the water supply line 20 and redirects water therefrom towards an outer surface 14 (e.g., first, front, exterior) of the wall 12. The elbow inlet 26 includes an engagement structure configured to engage a corresponding engagement element provided on the downstream end 24 water supply line 20. For example, an interior of the elbow inlet 26 includes an internally extending standardized national pipe thread ("NPT") that is configured to engage a corresponding threading provided on an exterior of downstream end 24 of the water supply line 20.

As shown by FIG. 1, the elbow outlet 28 (e.g. second end, downstream end, etc.) is oriented opposite an opening 18 (i.e., hole, orifice, etc.) extending between the outer surface 14 and an inner surface 16 (e.g., second, rear, interior) of the wall 12. Access to the elbow outlet 28 and the rest of the water supply assembly 10 located behind the wall 12 is typically limited to that provided by the opening 18. The opening 18 thus defines a passageway via which the plumbing fixture is fluidly coupled to an engagement structure (e.g. internal threading) provided by the elbow outlet 28.

A length of the connector conduit (e.g. the adapter 40) required to couple a plumbing fixture to the elbow 22 corresponds to a distance $L_{offset}$ by which the elbow outlet 28 is offset from the outer surface 14 of the wall 12. The spacing (e.g. lateral offset) between the elbow outlet 28 and the outer surface 14 of the wall 12 is not standardized, and may vary between different installation locations.

Figure 2:
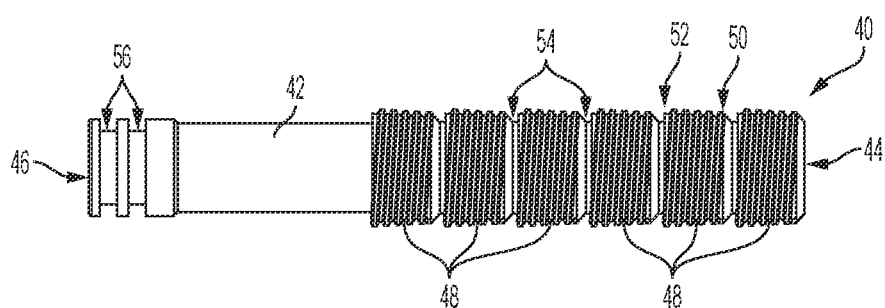
FIG. 2 is a side elevation of an adapter, according to an exemplary embodiment.
Figure 3:
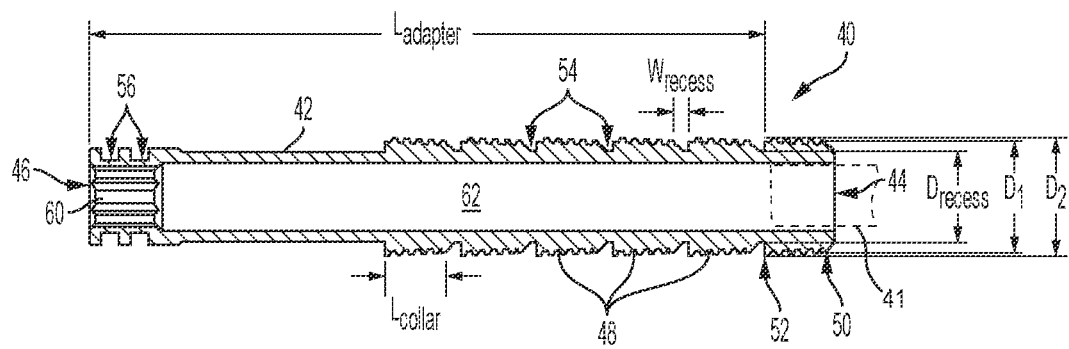
FIG. 3 is a cross-sectional view of the adapter in FIG. 2, according to an exemplary embodiment.

Turning to FIGS. 2 and 3, an adapter 40 configured to facilitate the fluid coupling of a plumbing fixture to a water supply assembly 10 is shown according to an exemplary embodiment. As described below, the adapter 40 incorporates a number of features configured to minimize the effort, time, and inconvenience typically associated with the installation of a plumbing fixture to a water supply assembly 10 using conventional connector conduit structures (e.g., a pipe nipple).

As shown in FIG. 2, the adapter 40 includes a substantially annular body 42 that extends between a first end 44 (e.g., an upstream end) and a second end 46 (e.g., a downstream end). A bore 62 configured to pass water therethrough extends through the annular body 42 between the first end 44 and the second end 46.

A plurality of annular collars 48 are integrally provided along the length of the annular body 42. The collars 48 are separable (e.g., from one another, from the annular body 42, etc.), and are configured to allow a user to adjust a length of the adapter 40 as needed during the installation of a plumbing fixture. As shown in FIG. 3, the collars 48 and annular body 42 are integrally formed (e.g. molded, cast, etc.) as a single, monolithic structure. However, some or all of the collars 48 may instead be discrete elements that are integrally coupled (e.g., soldered, welded, threaded, adhered, or otherwise attached) along the exterior of the annular body 42.

Each of the collars 48 defines a length $L_{collar}$ measured from a first end 50 (e.g. upstream end) to a second end 52 (e.g., downstream end). The collar length $L_{collar}$ may be standardized (e.g., approximately 0.5 inches) for all the collars 48, or may vary between some or all collars 48. An engagement structure (e.g. external threading) capable of fluidly coupling the adapter 40 to an elbow outlet 28 is provided along an exterior of each collar 48. As such, the modification of the length of the adapter 40 via the selective removal of one or more collars 48 does not compromise the ability of the adapter 40 to sealingly engage the elbow outlet 28.

The arrangement of the collars 48 relative to the annular body 42 and/or the type and arrangement of an engagement structure about each collar 48 may be varied to correspond to the particular configuration of a water supply assembly 10 to which the adapter 40 will be connected. For example, although the collars 48 are shown in FIGS. 2 and 3 as being externally threaded and provided along the exterior of the annular body 42 (e.g., define a male configuration), the collars 48 may instead be provided along the interior of the annular body 42 (e.g. define a female configuration), and the engagement structures of the collars 48 may include structures other than external threads.

The plurality of collars 48 are arranged in series downstream (e.g. inwards) from the first end 44 of the annular body 42 so that the first end 50 of a collar 48 is positioned opposite to a second end 52 of an adjacent collar 48. The first end 50 of each collar 48 defines an outer diameter $D_1$ that is less than an outer diameter $D_2$ of the second end 52 of the respective collar 48. Accordingly, as shown in FIG. 3, the dimensions of the exterior surface of each collar 48 varies (e.g. tapers linearly) between the first end 50 of a collar 48 and the respective second end 52 of the collar 48. The tapered configuration of the exterior surfaces of a collars 48 allows the collar 48 to adapt to variations in the diameters defined by elbow outlets 28 at different locations at which adapter 40 may be installed. Thus, the non-uniform external diameter of each collar 48 is configured to increase the compatibility the adapter 40 with elbows 22 (or other connectors) of various sizes.

Although FIGS. 2 and 3 show the first ends 50 of each collar 48 having substantially equally sized outer diameters $D_1$ and the second ends 52 of each of the collars 48 having substantially equally sized outer diameters $D_2$, the first and second outer diameters $D_1$, $D_2$ may be different for some of the collars 48. Additionally, although the exterior surfaces of the collars 48 are described as defining non-uniformly sized exterior surfaces that taper linearly between at first end 50 of a collar 48 and a respective second end 52 of the collar 48, the first and second outer diameters $D_1$, $D_2$ of some or all of the collars 48 may instead by substantially the same as one another.

The first end 50 of a collar 48 is separated (e.g., spaced apart, laterally offset, etc.) from the second end 52 of an adjacent collar 48 by an annular recess 54 (e.g., inset portion, exposed portion of an exterior of the body channel, groove, slot, kerf, etc.). For example, a recess width $W_{recess}$ that is greater than zero is defined between the second end 52 of a first collar 48 and an adjacent first end 50 of a second collar 48. As shown in FIG. 3, the portions of the adapter 40 exterior corresponding a recess 54 are defined by an outer diameter $D_{recess}$ that is less than each of the first outer diameter $D_1$ of a collar 48 and the second outer diameter $D_2$ of an adjacent collar 48 between which the recess 54 extends.

The recesses 54 extending between adjacent collars 48 provide a visual indicator via which an installer may more easily recognize locations along the annular body 42 at which the adapter 40 is to be cut to attain a desired adapter 40 length. Additionally, upon engagement of a collar 48 to the elbow outlet 28, the smaller diameter $D_{recess}$ of the recess 54 as compared to the first outer diameter $D_1$ of the collar 48 serves to isolate (e.g., space apart, vertically offset, etc.) the elbow outlet 28 from the outer profile of the recess 54. This isolation of the elbow outlet 28 form the outer profile of the recess 54 minimizes (or prevents) any deformation (e.g., shards, disruptions, anomalies etc.) of the outer profile of the recess 54 that may have been caused by the adjustment of the length of the adapter 40 from interfering in the engagement between the collar 48 and elbow outlet 28.

To further assist a user in customizing the length of the adapter 40, a thickness of the adapter 40 at locations corresponding to recesses 54 is less than a thickness of the adapter 40 at locations along which a collar 48 extends. This reduced thickness of the adapter 40 at the annular recesses 54 allows an installer to more easily cut through (e.g. detach, separate, etc.) a recess 54 during the adjustment of the adapter 40 length.

The second end 46 of the adapter 40 includes an engagement structure (e.g. fitting) configured to sealingly engage a plumbing fixture. The second end 46 of the adapter 40 may be defined by a variety of different engagement structure configurations. For example, as shown in FIGS. 2 and 3, the second end 46 of the adapter 40 comprises a slip fitting that includes a plurality (e.g. two) annular channels 56 formed within an exterior of the annular body 42. A gasket 58 (e.g., an O-ring) is supported within each channel 56, and extends radially outwards relative to an exterior of a portion of the annular body 42 located adjacent the channels 56 (see FIG. 5). The gaskets 58 are configured to engage an interior of a corresponding attachment structure 59 of a plumbing fixture to sealingly couple the adapter 40 to the plumbing fixture upon installation of the plumbing fixture to the adapter 40.

In contrast to the rotational movement required to engage a plumbing fixture to an external thread of a conventional pipe nipple, a slip fitting of the adapter 40 allows the plumbing fixture to be coupled to the adapter 40 using only a linear, sliding movement of the plumbing fixture relative to the adapter 40. Thus, the slip fitting of the adapter 40 allows the plumbing fixture to be installed flush against the outer surface of the wall 12 and in a desired clocked (e.g. aligned) orientation, without compromising either the sealing engagement between the adapter 40 and elbow outlet 28, or the sealing engagement between the adapter 40 and the plumbing fixture.

Referring again to FIG. 3, installation of the adapter 40 to a water supply assembly 10 may further be facilitated by an optional driving feature 60 that is operationally provided about an interior of the second end 46 of the adapter 40. The driving feature 60 includes a standardized structure configured to engage an installation tool 41 received therein. For example, the driving feature 60 includes a hexagonal opening configured to receive a hex key or a socket to assist a user in rotating the adapter 40 until the first end 44 of the adapter 40 is fully threading engaged with the elbow outlet 28.

Figure 4:
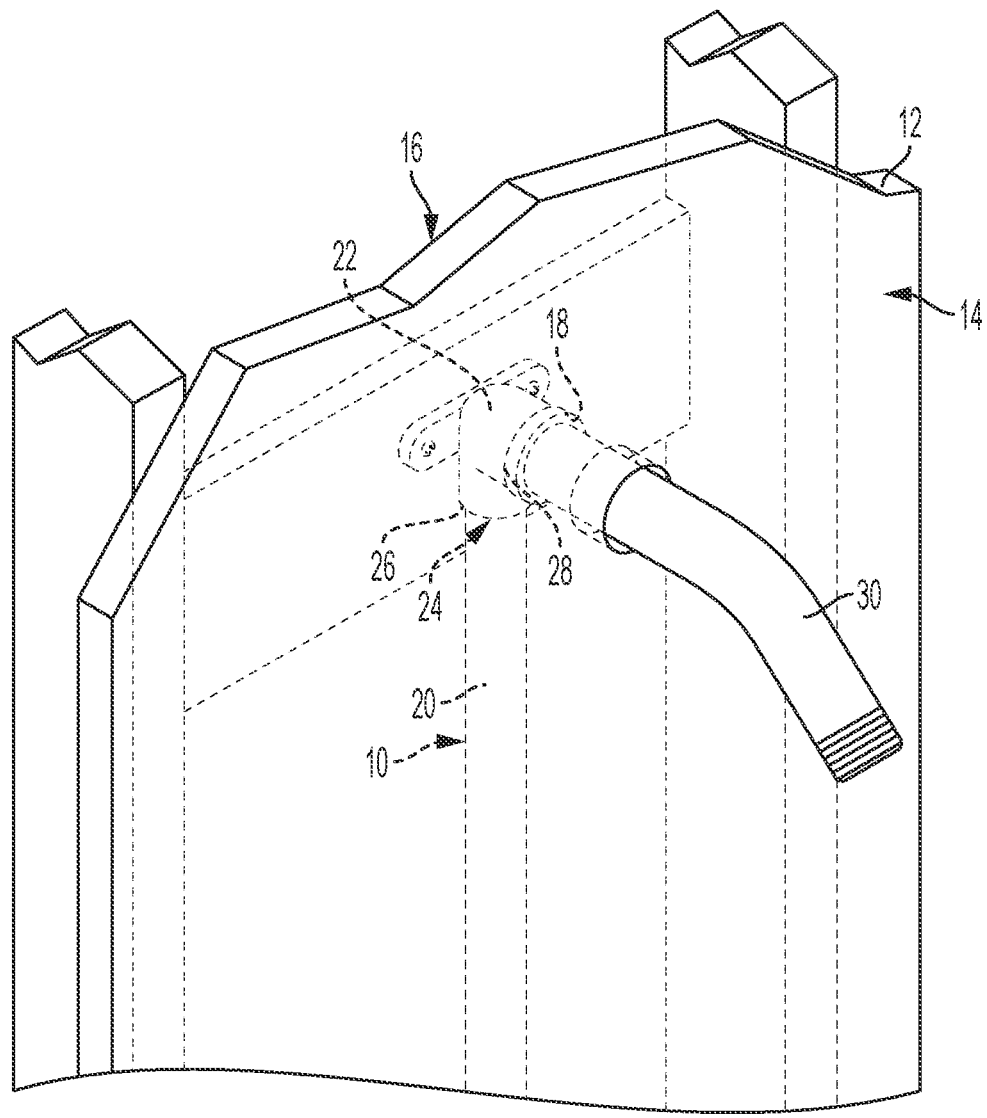
FIG. 4 is a perspective view of the water supply assembly of FIG. 1, prior to the removal of a previously installed spigot, according to an exemplary embodiment.
Figure 5:
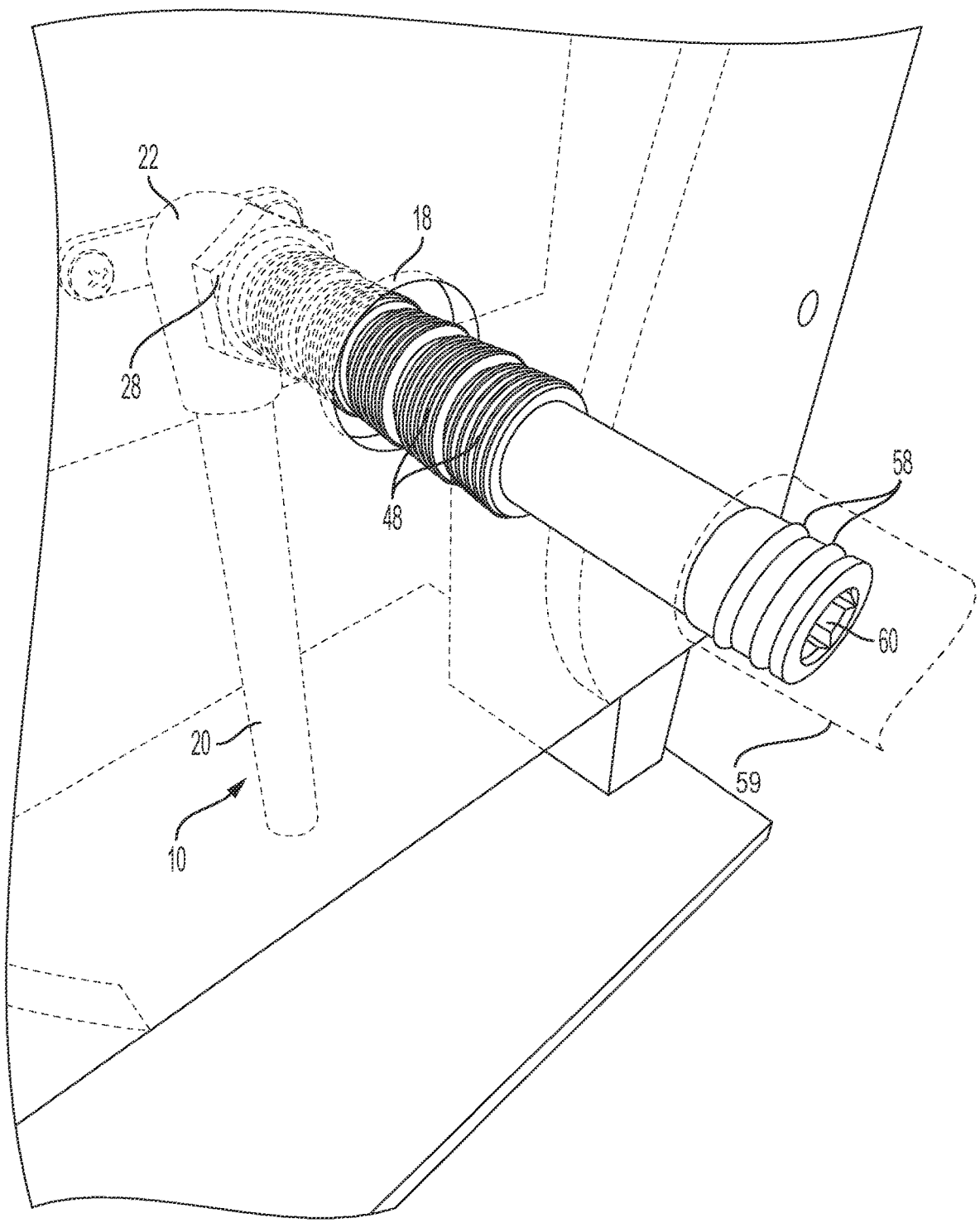
FIG. 5 is a perspective view of the adapter of FIG. 3 installed to the water supply assembly of FIG. 1, according to an exemplary embodiment.

The improved and simplified installation of a plumbing fixture to a water supply line 20 using the adapter 40 is described according to an exemplary method with reference to FIGS. 4 and 5. According to various embodiments, the adapter 40 is used during the retrofitting (e.g. replacement) of a water supply assembly 10 with a new plumbing fixture. Thus, as an initial step of the installation of the new plumbing fixture, an existing plumbing fixture (e.g., the spigot 30 of FIG. 4) is decoupled from the water supply assembly 10.

Given the non-standardized range of depths by which the elbow outlet 28 may be offset from the outer surface 14 of a wall 12, a next step in the installation of a plumbing fixture includes determining (e.g. measuring) the offset distance $L_{offset}$ of the elbow outlet 28 at the installation location. In the event that the water supply assembly 10 incorporates a connector structure other than an elbow 22 to which the adapter 40 is to be coupled, the offset distance $L_{offset}$ instead corresponds to a distance between the outer surface 14 of the wall 12 and the connector structure.

The determined offset distance $L_{offset}$ is used to identify a recess 54 along which to cut the adapter 40 so that a length $L_{adapter}$ of the resultant shortened adapter 40 will allow the adapter to fluidly couple the plumbing fixture to the water supply assembly 10. Notably, the modified adapter length $L_{adapter}$ is typically greater than the offset distance $L_{offset}$, such that at least a portion of the second end 46 of the annular body 42 extends beyond the outer surface 14 of the wall 12 upon installation of the adapter 40 in the elbow outlet 28 (see, e.g., FIG. 5).

The length $L_{adapter}$ to which the adapter 40 is cut is dependent on the offset distance $L_{offset}$ of the elbow outlet 28. Additionally, the length $L_{adapter}$ to which the adapter 40 is cut may vary based on the exposed length of the adapter 40 required for the coupling of the engagement structure (e.g. the slip fitting) of the adapter 40 to a corresponding attachment structure provided by the plumbing fixture.

For example, in embodiments in which the adapter 40 is provided separately from any specific plumbing fixture (e.g. the adapter 40 is used by an installer to install various types of plumbing fixtures), installation of the adapter 40 may also require that the required exposed length of the plumbing fixture being installed be determined (e.g. measured) by the installer. This required exposed length of the adapter 40 is equal to a distance between a mounting structure (e.g. base, plate, escutcheon, etc.) of the plumbing fixture and the attachment structure of the plumbing fixture via which the plumbing fixture is attached to the adapter 40. Once the combined offset distance $L_{offset}$ and required exposed adapter 40 length have been obtained, the adapter 40 is cut along a recess 54 that is defined by, or which is located immediately upstream from (i.e. located closer to the first end 44), a location along the annular body 42 that is separated from the second end 46 of the adapter 40 by the combined sum of the offset distance $L_{offset}$ and required exposed length of the adapter 40.

In embodiments in which the adapter 40 is configured to be used with a particular plumbing fixture model (e.g., the adapter 40 is supplied together with a plumbing fixture), the required exposed length of the adapter 40 is defined by a constant, known distance, and does not vary between different locations at which the adapter 40 and plumbing fixture are installed. In such embodiments, the recess 54 at which the adapter 40 is to be cut may accordingly be identified using only a measured offset distance $L_{offset}$ of the elbow outlet 28 at the installation location. A chart associating specific ranges of offset distances $L_{offset}$ with a recesses 54 along which to cut the adapter 40 (or a number of collars 48 to be removed from the adapter 40) allows an installer to quickly identify the appropriate number of collars 48 that are to be removed (or a recess 54 along which the adapter 40 is to be cut) upon determining the offset distances $L_{offset}$ of the elbow outlet 28. Markings (e.g. embossing or printing provided on the recesses 54; colored bands attached about the recesses 54, etc.) indicating a range of offset distances $L_{offset}$ that each recess 54 corresponds to may additionally (or alternatively) be formed or provided directly along the recesses 54 to further simplify the identification of a location at which the adapter 40 is to be cut.

Once the recess 54 along which the adapter 40 is to be cut (or the number of collars 48 to be removed) has been identified, the adapter 40 is cut fully through the identified recess 54 until any collars 48 located upstream from the identified recess 54 (i.e. between the identified recess 54 and the first end 44 of the adapter 40) are separated from a remaining portion of the annular body 42. This process shortens the overall length of the adapter 40 to a length $L_{adapter\ that}$ is configured to correspond to the requirements for installing the plumbing fixture at the desired installation location.

Following the adjustment of the adapter 40 to the desired installation length $L_{adapter}$, the adapter 40 is engaged to the elbow outlet 28 of the 22 (see FIG. 5) by an endmost collar 48 of the modified adapter 40 (i.e. a collar located adjacent the upstream end of the modified length adapter 40), and the plumbing fixture is attached (e.g. slid onto) to the exposed portion of the adapter 40 to install the plumbing fixture to the water supply assembly 10.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of this disclosure as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the position of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is to be understood that although the present invention has been described with regard to preferred embodiments thereof, various other embodiments and variants may occur to those skilled in the art, which are within the scope and spirit of the invention, and such other embodiments and variants are intended to be covered by corresponding claims. Those skilled in the art will readily appreciate that many modifications are possible (e.g., variations in sizes, dimensions, structures, shapes and proportions of the various elements, values of parameters, mounting arrangements, orientations, etc.) without materially departing from the novel teachings and advantages of the subject matter described herein. For example, the order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

What is claimed is:

1. A method of installing a plumbing fixture to an outlet of a water supply assembly located behind a wall, the method comprising:
   providing a plumbing fixture including an attachment structure;
   providing an adapter configured to couple the plumbing fixture to an outlet of a water supply assembly, the adapter comprising:
      an annular body extending between a first end and a second end and defining a bore extending therethrough;
      a plurality of collars provided along an exterior of the annular body and spaced inwardly from the first end such that each of the collars is separated from an adjacent one of the collars in a lateral direction by a recess; and
      an engagement structure provided along the exterior at the second end, the engagement structure configured to engage the attachment structure to couple the plumbing fixture to the adapter;
   removing a portion of the adapter including the first end and at least one of the collars to shorten a length of the adapter;
   engaging one of the collars with a corresponding structure provided on the outlet; and
   engaging the engagement structure with the attachment structure to couple the plumbing fixture to the adapter after removing the portion of the adapter.

2. The method of claim 1, wherein the collars are each individually configured to releasably engage the corresponding structure provided on the outlet.

3. The method of claim 2, wherein the one of the collars is located farthest from the second end.

4. The method of claim 2, wherein removing the at least one of the collars from the adapter comprises cutting the adapter along the recess to separate the at least one of the collars from the adapter.

5. The method of claim 2, wherein:
the adapter further comprises a driving structure formed along an interior of the annular body about a portion of the bore located adjacent the second end; and
the one of the collars is engaged with the corresponding structure provided on the outlet in response to a rotation of a tool that is engaged to the driving structure.

6. The method of claim 2, wherein an exterior surface of each of the collars is tapered.

7. The method of claim 1, wherein the engagement structure is engaged with the attachment structure without the plumbing fixture being rotated relative to the annular body.

8. The method of claim 1, wherein the adapter further comprises a driving structure formed along an interior of the annular body about a portion of the bore located adjacent the second end and configured to engage a tool received within the bore to rotate the adapter relative to the water supply assembly.

9. The method of claim 8, further comprising:
inserting the tool within the bore;
engaging the driving structure with the tool; and
rotating the adapter relative to the water supply assembly.

10. The method of claim 9, wherein engaging the engagement structure with the attachment structure occurs after rotating the adapter relative to the water supply assembly.

11. The method of claim 1, wherein an external thread is formed along an external surface of each of the collars, the external thread of each of the collars being configured to engage a corresponding internally extending thread provided by the outlet.

12. The method of claim 11, wherein engaging the one of the collars with the corresponding structure provided on the outlet comprises engaging the external thread of the one of the collars with the internally extending thread provided by the outlet.

13. The method of claim 1, wherein each of the collars has the same length.

14. A method comprising:
providing a plumbing fixture including an attachment structure;
providing an adapter configured to couple the plumbing fixture to an outlet of a water supply assembly, the adapter comprising:
an annular body extending between a first end and a second end and defining a bore extending therethrough;
a first collar provided along an exterior of the annular body;
a second collar provided along the exterior of the annular body;
a recess provided along the exterior of the annular body, the recess positioned between the first collar and the second collar;
an engagement structure provided along the exterior at the second end, the engagement structure configured to engage the attachment structure to couple the plumbing fixture to the adapter; and
a driving structure formed along an interior of the annular body about a portion of the bore located adjacent the second end and configured to engage a tool received within the bore to rotate the adapter;
engaging the engagement structure with the attachment structure; and
engaging the driving structure with the tool.

15. The method of claim 14, further comprising:
removing the first collar from the adapter by cutting the adapter along the recess before engaging the driving structure with the tool; and
coupling the second collar to the outlet after removing the first collar by rotating the tool and after engaging the driving structure with the tool.

16. The method of claim 15, further comprising engaging the attachment structure with the engagement structure to couple the plumbing fixture to the adapter after coupling the second collar to the outlet.

17. A method comprising:
providing a plumbing fixture including an attachment structure;
providing an adapter comprising:
an annular body defining a bore extending therethrough;
a collar provided along an exterior of the annular body, the collar configured to engage an outlet of a water supply assembly to couple the outlet to the adapter;
an engagement structure provided along the exterior, the engagement structure configured to engage the attachment structure to couple the plumbing fixture to the adapter; and
a driving structure formed along an interior of the annular body about a portion of the bore and configured to engage a tool received within the bore to rotate the adapter;
engaging the engagement structure with the attachment structure;
engaging the driving structure with the tool by placing the tool within the bore; and
rotating the adapter using the tool after engaging the driving structure with the tool.

18. The method of claim 17, further comprising coupling the collar to the outlet before engaging the engagement structure with the attachment structure.

19. The method of claim 18, wherein:
engaging the driving structure with the tool occurs before coupling the collar to the outlet; and
the collar is coupled to the outlet by rotation of the tool while the tool is engaged with the driving structure.

* * * * *